US012629999B2

(12) United States Patent
Schäufler et al.

(10) Patent No.: US 12,629,999 B2
(45) Date of Patent: May 19, 2026

(54) OPENABLE VEHICLE ROOF COMPRISING A LID ELEMENT, A FIXED ROOF ELEMENT AND A WEATHER-STRIP ASSEMBLY

(71) Applicant: Webasto SE, Stockdorf (DE)

(72) Inventors: Stefan Schäufler, Stockdorf (DE); Andreas Josef Zunzer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 341 days.

(21) Appl. No.: 18/558,868

(22) PCT Filed: May 4, 2022

(86) PCT No.: PCT/EP2022/062041
§ 371 (c)(1),
(2) Date: Nov. 3, 2023

(87) PCT Pub. No.: WO2022/233969
PCT Pub. Date: Nov. 10, 2022

(65) Prior Publication Data
US 2024/0239167 A1 Jul. 18, 2024

(30) Foreign Application Priority Data
May 7, 2021 (DE) ..................... 10 2021 111 972.3

(51) Int. Cl.
*B60J 10/82* (2016.01)
*B60J 7/04* (2006.01)
(Continued)

(52) U.S. Cl.
CPC ................. *B60J 10/82* (2016.02); *B60J 7/04* (2013.01); *B60J 10/21* (2016.02); *B60J 10/30* (2016.02);
(Continued)

(58) Field of Classification Search
CPC ... B60J 10/82; B60J 10/30; B60J 10/40; B60J 10/84; B60J 10/86; B60J 10/87;
(Continued)

(56) References Cited

U.S. PATENT DOCUMENTS 5,655,333 A 8/1997 Yamashita
6,270,154 B1 8/2001 Faerber
(Continued)

FOREIGN PATENT DOCUMENTS

DE 19924792 C1 8/2000
DE 102009009283 A1 8/2010
(Continued)

OTHER PUBLICATIONS

JP3672858 Text (Year: 2005).*
(Continued)

*Primary Examiner* — Dennis H Pedder
(74) *Attorney, Agent, or Firm* — Fitch, Even, Tabin & Flannery, LLP

(57) ABSTRACT

An openable vehicle roof having a fixed roof element and a roof opening system having a movable lid, the fixed roof element having with a weather-strip assembly at its front and lateral edges, a rear edge of the lid element being adjacent to a transverse leg of the weather-strip assembly of the fixed roof element when in the closed position, and the kinematic mechanism having a kinematic unit on either side of the roof plane, each kinematic unit having a deployment lever which slides on an associated longitudinal leg of the weather-strip assembly when the lid element is moved, the longitudinal legs of the weather-strip assembly each being connected to the transverse leg via a corner piece. The corner piece has at least one fixing base on its underside, the fixing base engaging a corresponding geometry formed on a molded portion with which the fixed roof element is provided.

7 Claims, 9 Drawing Sheets

(51) Int. Cl.

| | |
|---|---|
| *B60J 10/21* | (2016.01) |
| *B60J 10/30* | (2016.01) |
| *E05F 15/00* | (2015.01) |

(52) U.S. Cl.

CPC ......... *E05F 15/00* (2013.01); *E05Y 2201/626* (2013.01); *E05Y 2900/542* (2013.01)

(58) Field of Classification Search

CPC ... B60J 10/90; B60J 7/04; B60J 7/0435; B60J 7/047

USPC ........................... 296/216.02–5, 221, 220.01

See application file for complete search history.

(56) References Cited

U.S. PATENT DOCUMENTS

| | | | | |
|---|---|---|---|---|
| 10,336,169 | B2 * | 7/2019 | Kanphade | B60J 10/18 |
| 10,647,188 | B2 * | 5/2020 | van de Westerlo | B60J 10/82 |
| 2005/0229495 | A1 | 10/2005 | Murase | |
| 2022/0153101 | A1 | 5/2022 | Wenzel | |

FOREIGN PATENT DOCUMENTS

| | | | |
|---|---|---|---|
| DE | 102019002422 | A1 | 10/2020 |
| DE | 102019003406 | A1 | 11/2020 |
| EP | 2848442 | A2 | 3/2015 |
| EP | 2848442 | A3 | 4/2015 |
| FR | 2726512 | A1 | 5/1996 |
| JP | 2000158950 | A | 6/2000 |
| JP | 3672858 | B2 * | 7/2005 |

OTHER PUBLICATIONS

ISR and Written Opinion for PCT/EP2022/062041; mailed Aug. 17, 2022, (German and English translation); 26 pages.

Office Action issued against corresponding German Application No. 10 2021 111 972.3; mailed Dec. 10, 2021 in German with English Translation (6 pages).

Office Action issued against corresponding German Application No. 10 2021 111 972.3; mailed Jul. 14, 2023; In German with English Machine Translation (8 pages).

IPRP for PCT/EP2022/062041; mailed Nov. 16, 2023; In English (7 pages).

* cited by examiner

OPENABLE VEHICLE ROOF COMPRISING A LID ELEMENT, A FIXED ROOF ELEMENT AND A WEATHER-STRIP ASSEMBLY

CROSS-REFERENCE TO RELATED APPLICATIONS

This application is a U.S. national phase application filed under 35 U.S.C. § 371 of International Application No. PCT/EP2022/062041, filed on May 4, 2022, published under WO 2022/233969A1 on Nov. 10, 2022, designating the United States, which claims priority from German Patent Application Number 10 2021 111 972.3, filed on May 7, 2021, which are hereby incorporated herein by reference in their entirety.

FIELD

The invention relates to an openable vehicle roof having the features of the preamble of claim 1.

BACKGROUND

A vehicle roof of this kind is known from DE 10 2019 003 406 A1 and configured in particular as a panoramic roof of a passenger car. The panoramic roof has a fixed roof element, which may have a glass element for forming a see-through area and covers in particular a rear area of a vehicle interior located above a rear bench seat. Additionally, the vehicle roof has a roof opening system comprising a lid element configured to be moved between a closed position, in which it closes a roof opening, and an open position, in which the roof opening is at least partially open, by a kinematic mechanism. The fixed roof element is provided with a weather-strip assembly on its front edge, which faces the roof opening, and on its lateral edges, which are disposed on either side of a vertical longitudinal center roof plane. In its closed position, a rear edge of the lid element is in contact with a transverse leg of the weather-strip assembly. The kinematic mechanism for moving the lid element has a kinematic unit on either side of the vertical longitudinal roof center plane, each kinematic unit having a deployment lever which is moved in the direction of the vehicle rear when the lid element is moved in the longitudinal roof direction and is guided along an associated longitudinal leg of the weather-strip assembly in the process. The deployment levers cause the lid element to be raised, allowing it to be moved over the fixed roof element for being moved from the closed position to the open position. When the deployment levers are moved in the rear direction from the closed position, they first move onto an area of transition between the transverse leg and the associated longitudinal leg of the weather-strip assembly in a first movement phase. The area of transition is in loose contact with a polyurethane frame which surrounds the glass element like a frame. There is therefore the problem that the area of transition is crushed in such a manner when the lid element is in the closed position that an unattractive appearance results and tightness may be compromised. In addition, frequent operation of the lid element can cause deformation of the area of transition, which can also impair the visual appearance and compromise tightness. A shift of the area of transition is also conceivable.

A vehicle roof comprising a fixed roof element having a circumferential weather-strip assembly is known from DE 10 2009 009 283 A1. The weather-strip assembly has a rib-like sealing base that is interrupted. The interruption is engaged by protrusions formed on a molded portion of the fixed roof element, which has a sealing groove for receiving the sealing base.

SUMMARY

The object of the invention is to provide an openable vehicle roof of the type mentioned above in which the problems described above are eliminated.

According to the invention, this object is attained by the openable vehicle roof having the features of claim 1.

So the invention proposes a vehicle roof comprising a fixed roof element, a roof opening disposed forward of the fixed roof element, and a roof opening system having a lid element configured to be moved between a closed position, in which the lid element closes the roof opening, and an open position, in which the roof opening is at least partially open, by a kinematic mechanism. The fixed roof element is provided with a weather-strip assembly at its front edge and at its lateral edges disposed on either side of a vertical longitudinal center roof plane. In the closed position, the rear edge of the lid element is adjacent to a transverse leg of the weather-strip assembly of the fixed roof element. The kinematic mechanism comprises a on either side of the vertical roof longitudinal center plane, each kinematic unit having a deployment lever which slides on an associated longitudinal leg of the weather-strip assembly when the lid element is moved in the longitudinal roof direction. The longitudinal legs of the weather-strip assembly are connected to the transverse leg via a corner piece, which has at least one fixing base on its underside, the fixing base engaging a corresponding geometry formed on a molded portion with which the fixed roof element is provided.

So the weather-strip assembly of the openable vehicle roof according to the invention forms a structural unit composed of at least five elements which are joined to each other, namely two longitudinal legs, one transverse leg and two corner pieces, the corner pieces each connecting one of the longitudinal legs to the transverse leg and thus constituting connecting elements, or a structural unit composed of at least three elements which are joined to each other, wherein one corner piece and one longitudinal leg can be produced in one piece in a single process in each case and the corner pieces are attached or molded to the transverse leg. The corner pieces represent the parts of the weather-strip assembly onto which the deployment levers of the kinematic mechanism for moving the lid element slide first when the lid element is moved in the rear direction. Due to the at least one fixing base, which engages a corresponding geometry formed on the molded portion with which the fixed roof element is provided, the fixing bases each have a defined installation position, which can be maintained even when the lid element is operated frequently. The risk that the corner pieces slip or fold away relative to the molded portion because the deployment lever slides onto them or the rear edge of the lid element comes into contact with them is minimized. This in turn leads to a visually appealing design and also to a high degree of tightness. The risk of potential water ingress into the vehicle in the area of the transition between the transverse leg of the weather-strip assembly and the longitudinal legs of the weather-strip assembly can thus be reduced. The fixing base prevents the corner piece form being undercut by water, so no water can seep through between the corner piece and the molded portion. Instead, the water is drained off by the fixing base. The fixing base also counteracts any misalignment of the corner piece relative to the molded portion. The position of the corner pieces relative to the adjacent parts is clearly and cleanly defined by the fixing base. In its closed position, the lid element is always in proper contact with the weather-strip assembly and the corner pieces, thus ensuring a high degree of tightness.

The molded portion of the vehicle roof according to the invention is in particular a plastic area which surrounds a panel element of the fixed roof section in a frame-like manner and via which the surface element is connected to a roof frame. For example, the molded portion is made of a polyurethane material by foaming.

In a preferred embodiment of the openable vehicle roof according to the invention, the weather-strip assembly is configured in such a manner that the fixing base of the corner piece is aligned with a fixing rib formed on the transverse leg or the associated longitudinal leg of the weather-strip assembly. The geometry which the fixing base engages may be an extension of a fixing groove in which the fixing rib of the transverse leg or the associated longitudinal leg is disposed when the weather-strip assembly is in the installation position.

In another preferred embodiment of the openable vehicle roof according to the invention, in which the risk of slipping or faulty installation of the weather-strip assembly is further minimized, the fixing base is spaced apart from the fixing rib by a recess or the fixing rib is interrupted by a recess or the fixing base is interrupted by a recess, a protrusion of the molded portion form-fittingly engaging the recess, which is disposed between the fixing base and the fixing rib or forms an interruption of the fixing rib or an interruption of the fixing base.

Preferably, the recess is disposed in the area of the fixing rib since the longitudinal leg or the transverse leg is designed in particular as an extruded element whose material is harder and more robust than the material of the corner piece. On the other hand, the position of the recess in the area of the fixing base of the corner piece, i.e., the position of the recess on the corner piece, offers the advantage that the recess can be formed directly during the molding of the corner piece and the fixing rib does not have to be processed after the extrusion of the transverse leg or the associated longitudinal leg.

In a specific embodiment of the openable vehicle roof according to the invention, the geometry of the molded portion which the fixing base engages has an undercut in order to ensure a stable connection of the corner piece to the molded portion.

In a specific embodiment of the openable vehicle roof according to the invention, the corner pieces each comprise two fixing bases, specifically a fixing base on a first leg, which is adjacent to the transverse leg of the weather-strip assembly, and a fixing base on a second leg, which is adjacent to the associated longitudinal leg of the weather-strip assembly, the fixing bases being aligned with respective fixing ribs of the transverse leg and the associated longitudinal leg.

The longitudinal legs and the transverse leg of the weather strip profile may each be formed by a weather strip profile produced by extrusion.

In a particular embodiment of the openable vehicle roof according to the invention, the corner pieces, which may be made of an elastomer, in particular EPDM or TPV, are each connected to one of the longitudinal leg and to the transverse leg of the weather-strip assembly by vulcanization or injection molding.

The invention also relates to an openable vehicle roof comprising a fixed roof element, a roof opening disposed forward of the fixed roof element, and a roof opening system having a lid element configured to be moved between a closed position, in which the lid element closes the roof opening, and an open position, in which the roof opening is at least partially open, by means of a kinematic mechanism, the fixed roof element being provided with a weather-strip assembly at its front edge and its lateral edges disposed on either side of a vertical longitudinal center roof plane. In the closed position, the rear edge of the lid element is adjacent to a transverse leg of the weather-strip assembly of the fixed roof element, and the kinematic mechanism comprises a on either side of the vertical longitudinal center roof plane, each kinematic unit having a deployment lever which slides on an associated longitudinal leg of the weather-strip assembly when the lid element is moved in the longitudinal roof direction. The longitudinal legs of the weather-strip assembly are each connected to the transverse leg via respective corner pieces, a molded portion with which the fixed roof element is provided and to which the weather-strip assembly is fixed having a protrusion form-fittingly engaging a recess formed on a fixing base of the corner piece or between a fixing base of the corner piece and a fixing rib of the transverse leg or of the associated longitudinal leg of the weather-strip assembly.

Further advantages and advantageous embodiments of the subject matter of the invention are apparent from the description, the drawing and the patent claims.

BRIEF DESCRIPTIONS OF THE DRAWINGS

An embodiment of an openable vehicle roof according to the invention is schematically illustrated in the drawing and will be explained in more detail in the following description.

DETAILED DESCRIPTION

Figure 1:
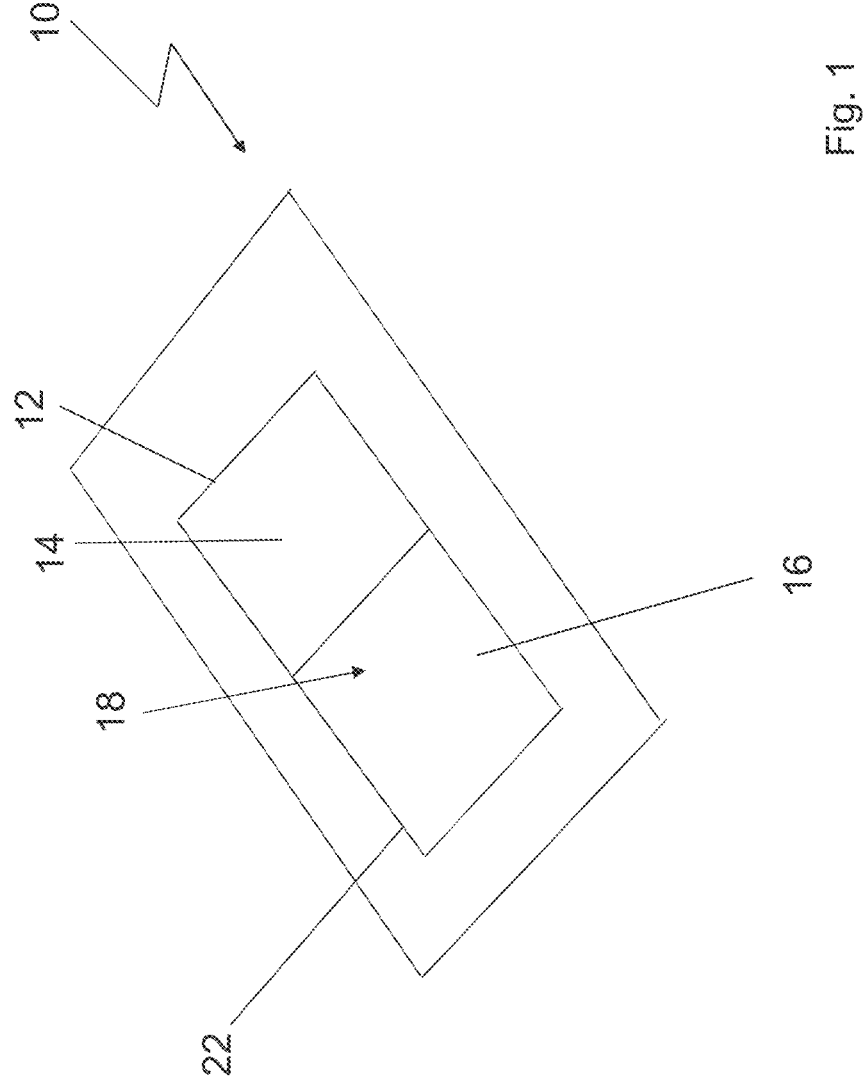
FIG. 1 is a perspective top view of a vehicle roof having a modular insert for forming a panoramic roof portion.
Figure 2:
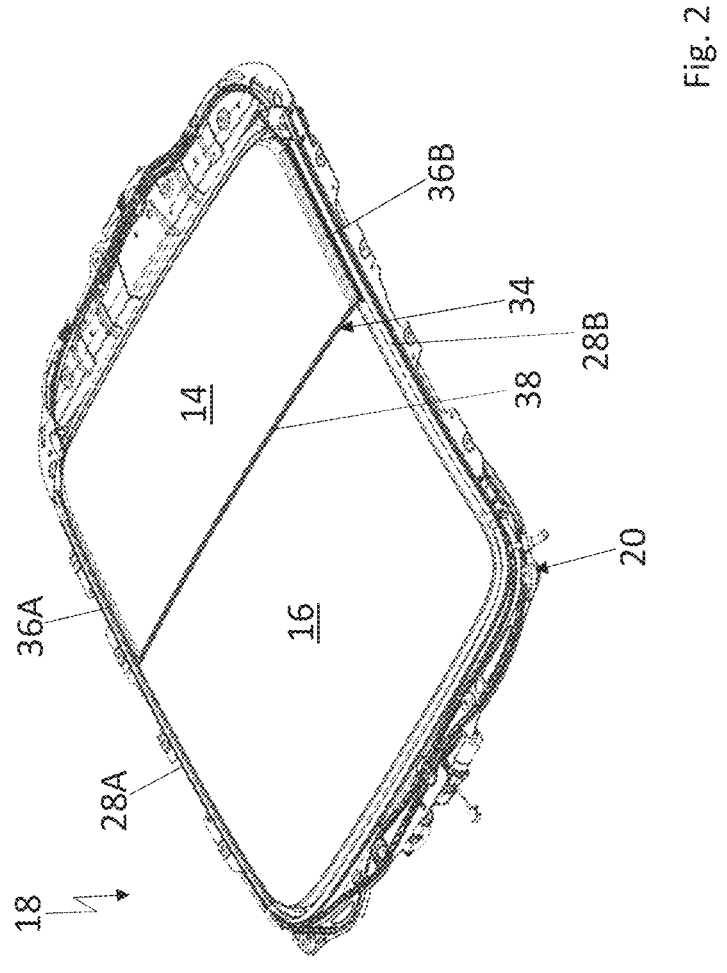
FIG. 2 is a perspective top view of the modular insert, a lid element being in a closed position.
Figure 3:
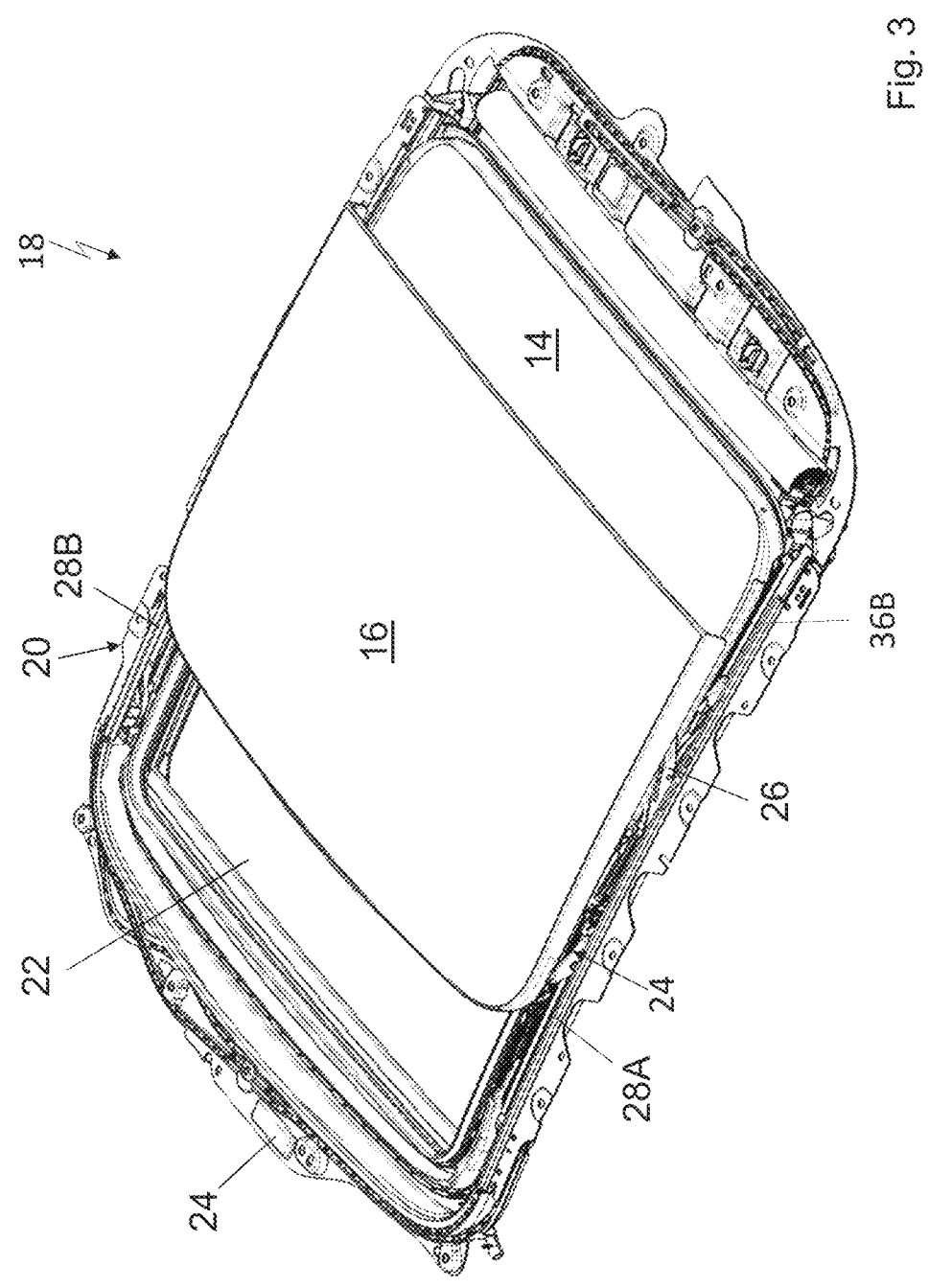
FIG. 3 is a perspective top view of the modular insert, the lid element being in an open position.

The drawing shows a vehicle roof 10 which is designed as a panoramic roof and has a roof cutout 12 in which a fixed roof element 14 fixed to the vehicle and a lid element 16 are disposed, both of which are part of a modular insert 18, which is shown on its own in FIGS. 2 and 3 and which is connected to the rest of the roof structure via a roof frame and which constitutes a bearing member for the fixed roof element 14 and the lid element 16. The roof frame 20 of the insert 18 forms a roof opening 22 which can be selectively closed or opened by means of the movable lid element 16.

The lid element 16, which is part of a roof opening system, can be moved between a closed position (FIG. 2), in which the roof opening 22 is closed, and an open position (FIG. 3), in which the roof opening 22 is at least partially open, by means of a kinematic mechanism 24. As can be seen in FIG. 3, the lid element 16 is at least partially moved over the fixed roof element 14 when in its open position. In the closed position, on the other hand, the lid element 16 is disposed completely forward of the fixed roof element 14, specifically in a position in which it is at least largely flush or aligned with the fixed roof element 14.

The kinematic mechanism 24 comprises a kinematic unit on either side of a vertical longitudinal center roof plane, each kinematic unit having a deployment lever 26 which is pivoted, i.e., deployed, in such a manner when the lid element 16 is moved that the lid element 16 is raised relative to the fixed roof element 14. In addition, the deployment levers 26 are each moved in the longitudinal direction of the vehicle in an associated guide rail when the lid element 16 is moved in the longitudinal direction of the vehicle. The guide rails are formed on longitudinal legs 28A and 28B of the roof frame 20. As can be seen from FIG. 3 in particular, the deployment levers 26 are each moved along an associated lateral edge of the fixed roof element 14 when the lid element 16 is moved.

The fixed roof element 14 comprises a glass panel 30, which is rigidly fixed to the roof frame 20 via a polyurethane molded portion 32, which encloses the glass panel 30 in a frame-like manner.

Figure 4:
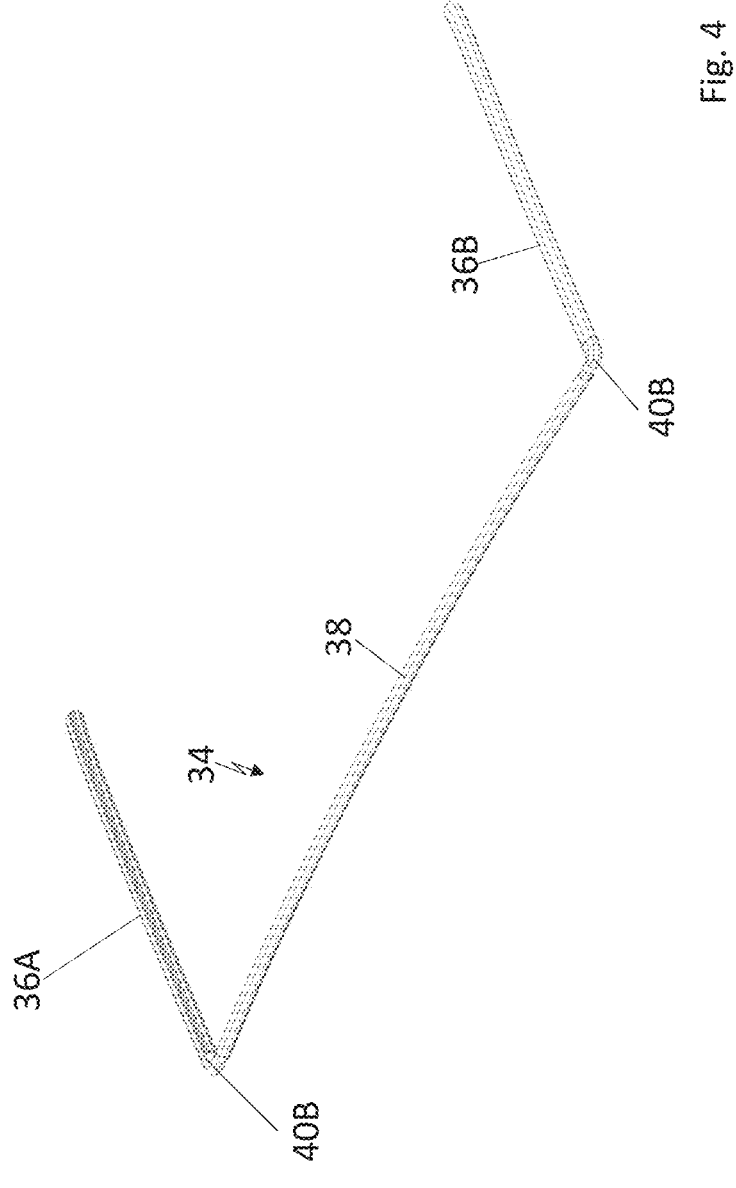
FIG. 4 is a perspective view of a weather-strip assembly of a fixed roof element of the modular insert.
Figure 5:
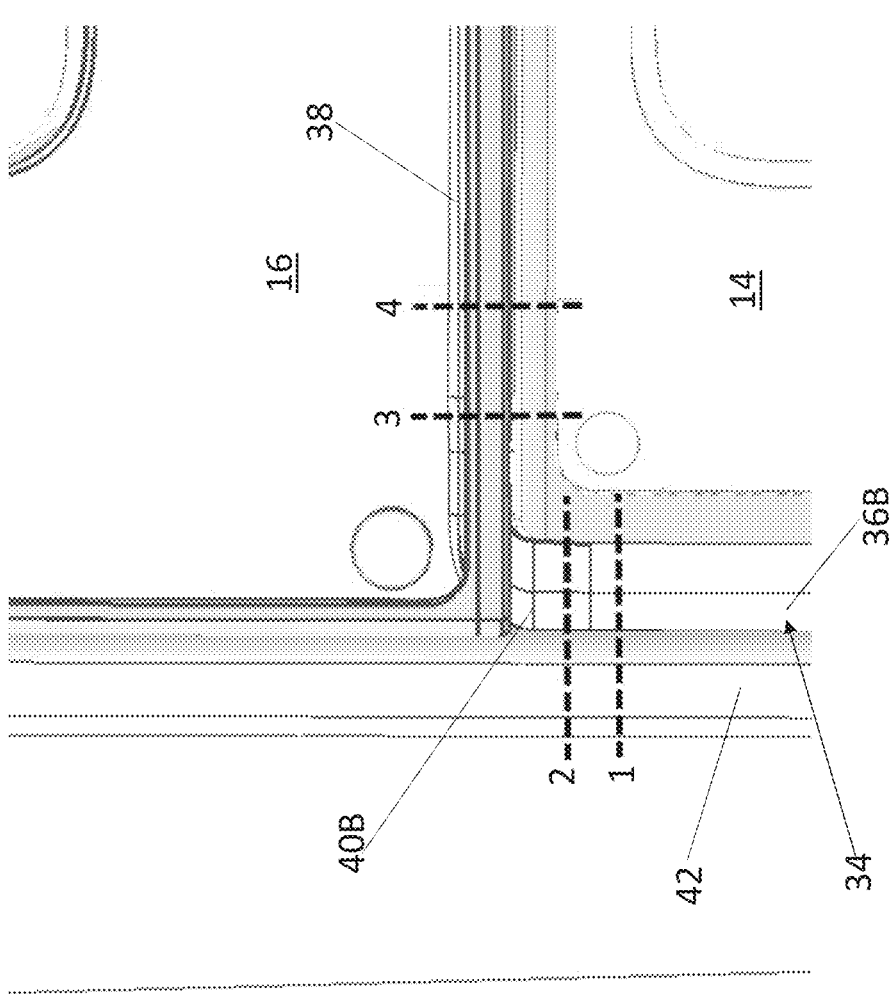
FIG. 5 is a top view of a front left corner area of the fixed roof element in the installed position and with the lid element in the closed position.
Figures 6, 7:
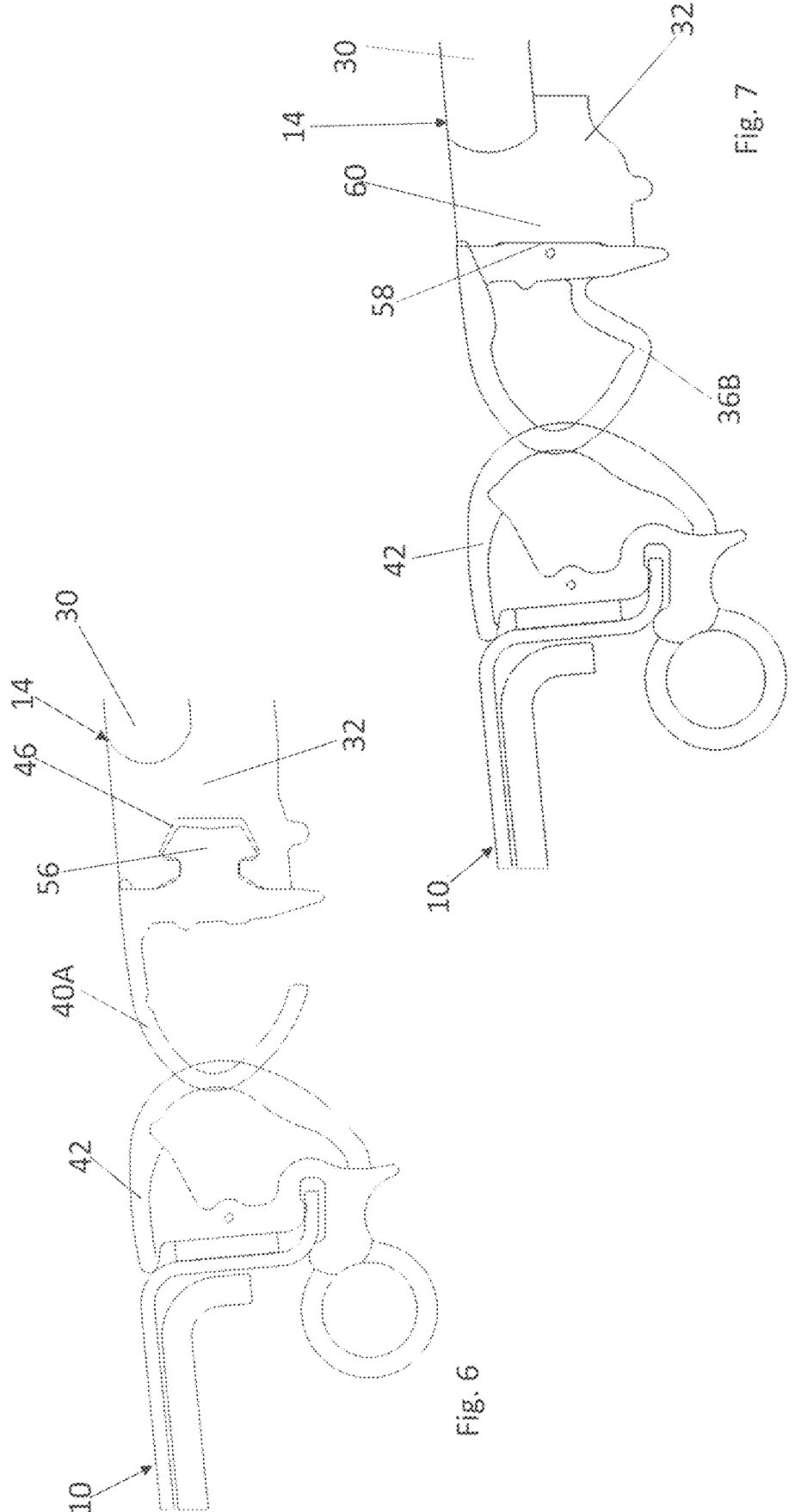
FIG. 6 is a section through the vehicle roof along line 1 in FIG. 5.
FIG. 7 is a section through the vehicle roof along line 2 in FIG. 5.
Figure 9:
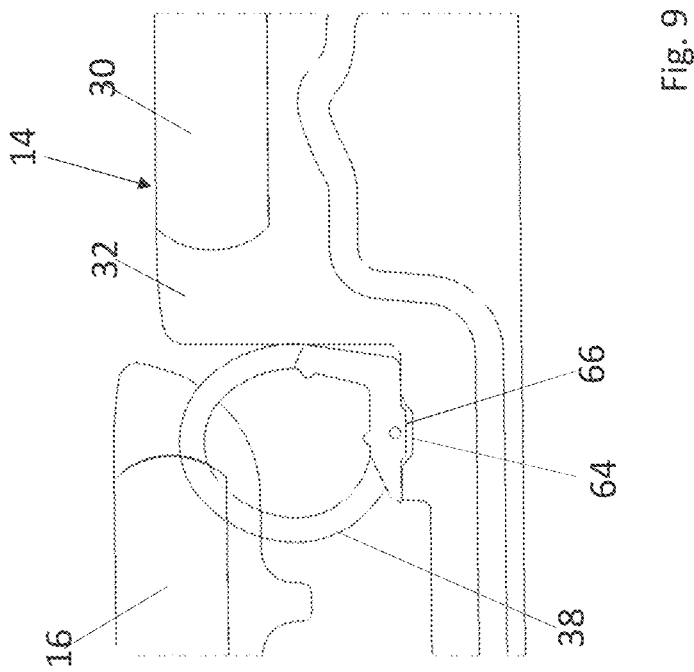
FIG. 9 is a section through the vehicle roof along line 4 in FIG. 5.
Figure 8:
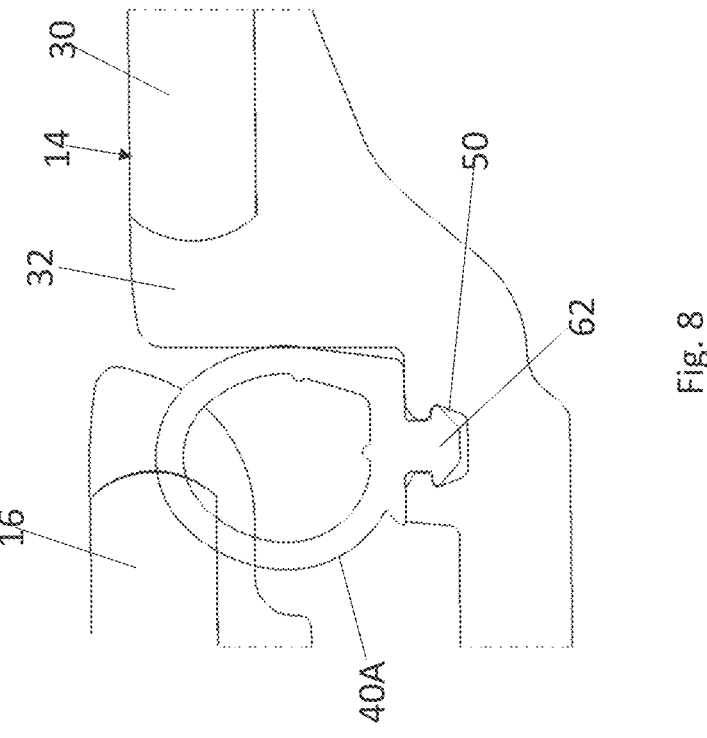
FIG. 8 is a section through the vehicle roof along line 3 in FIG. 5.
Figure 11:
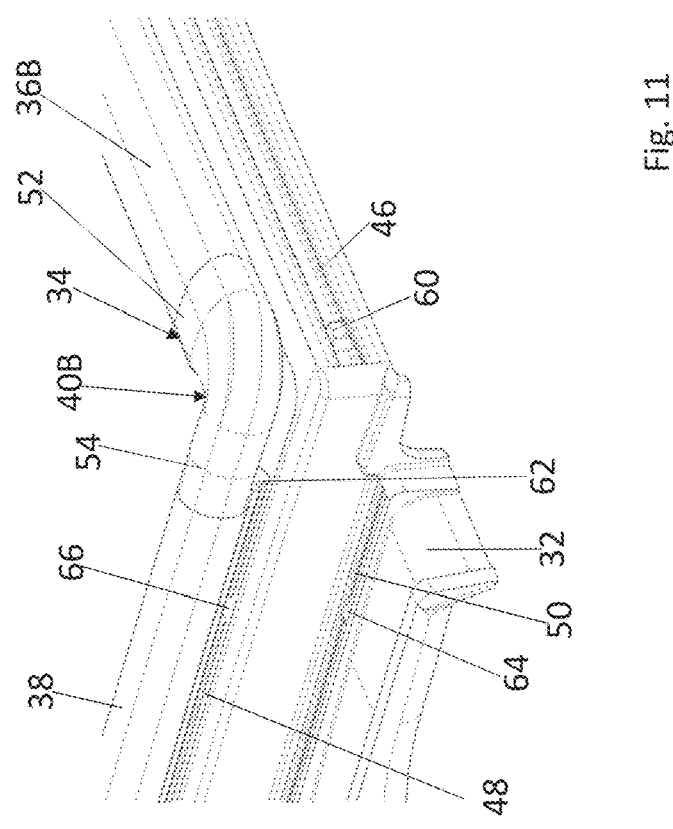
FIG. 11 is another perspective view of the front left corner area of the fixed roof element with the weather-strip assembly removed.
Figure 10:
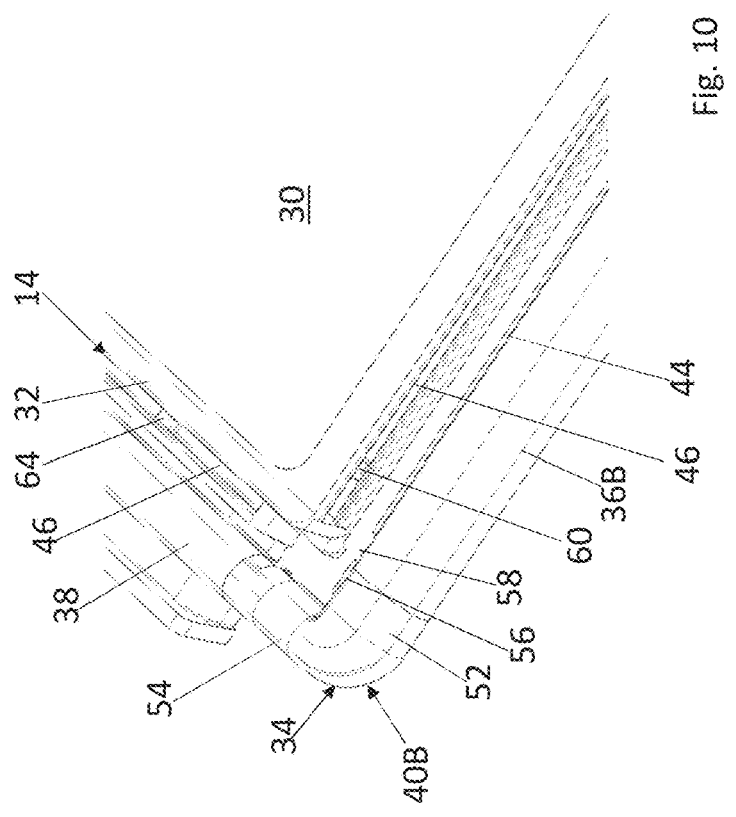
FIG. 10 is a perspective view of a front left corner area of the fixed roof element with the weather-strip assembly removed.
Figures 12, 13:
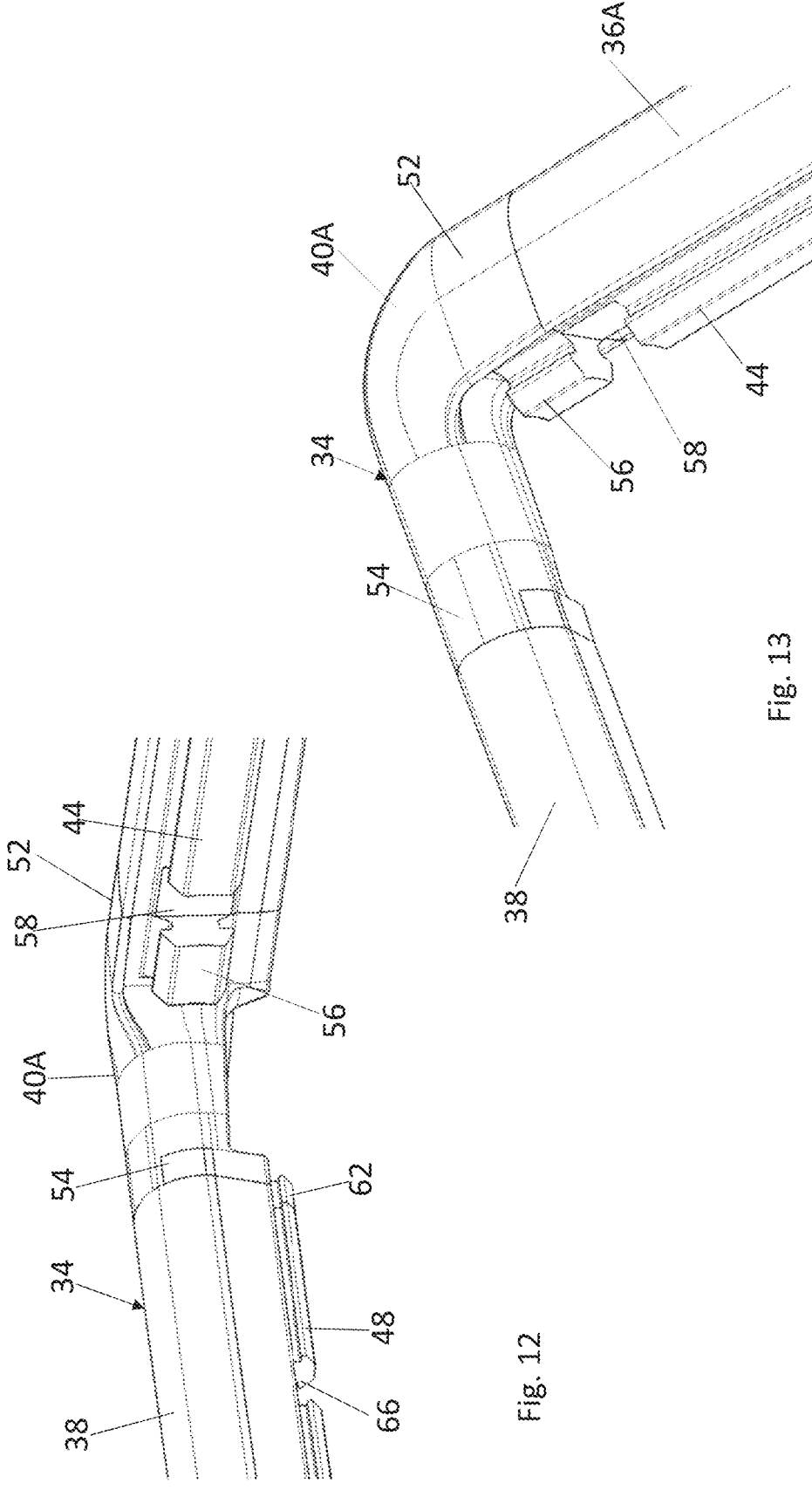
FIG. 12 is a perspective interior view of a front right corner area of the weather-strip assembly.
FIG. 13 is another perspective view of the front right corner area of the weather-strip assembly.

In order to seal the vehicle interior from the vehicle environment when the lid element 16 is in the closed position, the fixed roof element 14 is provided with a weather-strip assembly 34 which, as shown in FIG. 4, has a U shape and comprises two longitudinal leg 36A and 36B, which each extend along an associated lateral edge of the fixed roof element 14, and a transverse leg 38, which extends in the transverse direction of the vehicle and cooperates with the lid element 16 when the latter is in the closed position. The longitudinal legs 36A and 36B of the weather-strip assembly 34 are each connected to the transverse leg 38 via what is referred to as corner pieces 40A and 40B, respectively. When the lid element 16 is moved in the longitudinal roof direction, the deployment levers 26 slide on the longitudinal legs 36A and 36B of the weather-strip assembly 34. In their initial position, the longitudinal legs 36A and 36B of the weather-strip assembly 34 cooperate with respective lateral weather strips 42, which are connected to the sections of the vehicle roof 10 surrounding the roof cutout 12.

The longitudinal legs 36A and 36B and the transverse leg 38 of the weather-strip assembly 34 are extruded profiles and are made of an EPDM or TPV material, for example. In order to improve the sliding properties of the EPDM or TPV material, it can be coated or blended with a friction-modifying additive, such as graphite, PTFE, PFPE, silicone, polyurethane, polyurethane dispersions, carbon black and/or the like.

The corner pieces 40A and 40B are each made of an elastomer, such as a thermoplastic vulcanizate or injection molding material such as EPDM, which can also be blended or coated with a friction-modifying additive comprising in particular graphite, PTFE and/or a lubricating oil. The corner pieces 40A and 40B are attached to the longitudinal leg 36A and 36B and to the transverse leg 38 in a form-fitting and bonded manner by vulcanization.

For being fixed to the polyurethane molded portion of the fixed roof element 14, the longitudinal legs 36A and 36B of the weather-strip assembly 34 each have a fixing rib 44 on their side facing the glass panel 30, each fixing rib 44 having a cross section which is mushroom-shaped in the broadest sense and engaging a correspondingly formed groove-like geometry 46 of the polyurethane molded portion 32. The geometry 46 is provided with an undercut.

The transverse leg 38 of the weather-strip assembly 34 has a fixing rib 48 on its underside, whose cross section is also mushroom-shaped in the broadest sense and which engages a correspondingly formed geometry 50 which is formed on a base of the polyurethane molded portion 32 and which is groove-shaped and provided with an undercut.

The corner pieces 40A and 40B are rectangular in the broadest sense and each have a first leg 52, which is adjacent to the associated longitudinal leg 36A or 36B of the weather-strip assembly 34, and a second leg 54, which is adjacent to the transverse leg 38 of the weather-strip assembly 34. A fixing base 56 is formed on the leg 52, said fixing base 56 being aligned with the fixing rib 44 of the associated longitudinal leg 36A or 36B but separated therefrom by a recess 58, which is formed by mechanically cutting the fixing rib 44 to length after extrusion of the associated longitudinal leg 36A or 36B. In the installed state, the recess 58 is engaged by a protrusion 60 formed in the geometry 50 of the polyurethane molded portion 32 which the fixing rib 48 engages.

A fixing base 62 is formed on the underside of the respective second legs 54 of the corner pieces 40A and 40B, the fixing base 62 being adjacent to the fixing rib 48 of the transverse leg 38 and being aligned therewith. The fixing base 62 also engages the geometry 50 which engages the fixing rib 48 of the transverse leg 38.

To even better ensure a precisely fitting installation of the weather-strip assembly 34 on the polyurethane molded portion 32, a protrusion 64 is formed in the geometry 50, said protrusion 64 engaging a recess 66 interrupting the fixing rib 48.

The invention claimed is:

1. An openable vehicle roof comprising:
a fixed roof element,
a roof opening disposed forward of the fixed roof element, and a roof opening system having a lid element configured to be moved between a closed position, in which the lid element closes the roof opening, and an open position, in which the roof opening is at least partially open, by means of a kinematic mechanism, the fixed roof element being provided with a weather-strip assembly at its front edge and its lateral edges disposed on either side of a vertical longitudinal center roof plane, a rear edge of the lid element being adjacent to a transverse leg of the weather-strip assembly of the fixed roof element when in the closed position, and
the kinematic mechanism comprising a kinematic unit on either side of the vertical longitudinal center roof plane, each kinematic unit having a deployment lever which slides on an associated longitudinal leg of the weather-strip assembly when the lid element is moved in the longitudinal roof direction, the longitudinal legs of the weather-strip assembly each being connected to the transverse leg via a corner piece, wherein the corner piece has at least one fixing base on its underside, the fixing base engaging a corresponding geometry formed on a molded portion with which the fixed roof element is provided, and wherein the fixing base is aligned with a fixing rib formed on the transverse leg or the associated longitudinal leg of the weather-strip assembly.

2. The openable vehicle roof according to claim 1, wherein the fixing base is spaced apart from the fixing rib by a recess or the fixing rib is interrupted by a recess or the fixing base is interrupted by a recess, a protrusion of the molded portion engaging the recess, which is disposed between the fixing base and the fixing rib or forms an interruption of the fixing rib or an interruption of the fixing base.

3. The openable vehicle roof according to claim 1, wherein the geometry of the molded portion engaged by the fixing base has an undercut.

4. An openable vehicle roof comprising: a fixed roof element, a roof opening disposed forward of the fixed roof element, and a roof opening system having a lid element configured to be moved between a closed position, in which the lid element closes the roof opening, and an open position, in which the roof opening is at least partially open, by means of a kinematic mechanism, the fixed roof element being provided with a weather-strip assembly at its front edge and its lateral edges disposed on either side of a vertical longitudinal center roof plane, a rear edge of the lid element being adjacent to a transverse leg of the weather-strip assembly of the fixed roof element when in the closed position, and the kinematic mechanism comprising a kinematic unit on either side of the vertical longitudinal center roof plane, each kinematic unit having a deployment lever which slides on an associated longitudinal leg of the weather-strip assembly when the lid element is moved in the longitudinal roof direction, the longitudinal legs of the weather-strip assembly each being connected to the transverse leg via a corner piece, wherein a molded portion with which the fixed roof element is provided and to which the weather-strip assembly is fixed has a protrusion engaging a recess formed on a fixing base of the corner piece or between a fixing base of the corner piece and a fixing rib of the transverse leg or of the associated longitudinal leg of the weather-strip assembly.

5. The openable vehicle roof according to claim 1, wherein the corner pieces each have a first leg, which is adjacent to the transverse leg of the weather-strip assembly, and a second leg, which is adjacent to the associated longitudinal leg of the weather-strip assembly, and a fixing base is formed on both legs, each fixing base being aligned with an associated fixing rib of the transverse leg or of the associated longitudinal leg.

6. The openable vehicle roof according claim 1, wherein the longitudinal legs and the transverse leg are each formed by a weather-strip profile.

7. The openable vehicle roof according to claim 1, wherein the corner pieces are each connected to one of the longitudinal legs and the transverse leg by vulcanization or injection molding.

\* \* \* \* \*